though not limited.

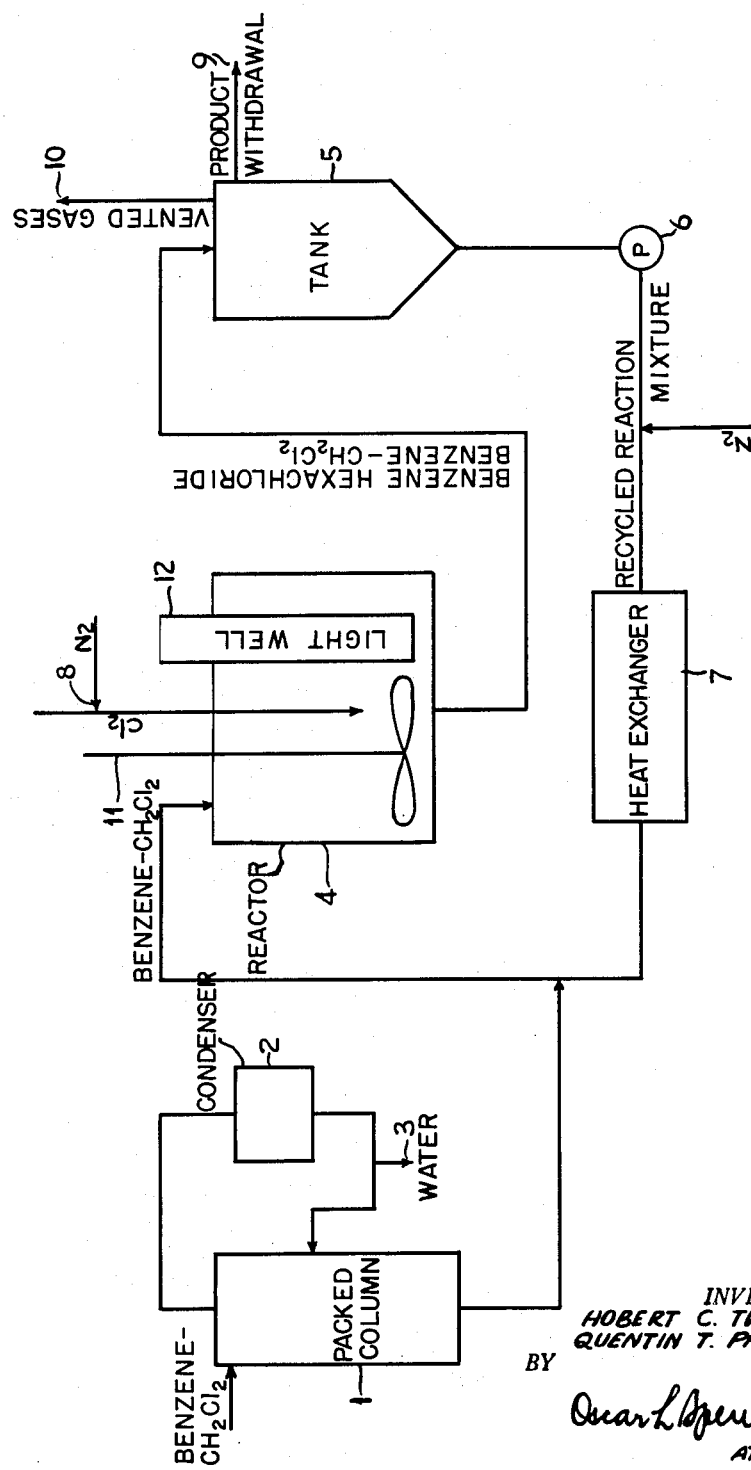

United States Patent Office 2,744,145
Patented May 1, 1956

2,744,145

PRODUCTION OF BENZENE HEXACHLORIDE IN IRON REACTION CHAMBERS

Hobert C. Twiehaus and Quentin T. Prindle, New Martinsville, W. Va., assignors to Columbia-Southern Chemical Corporation Application November 14, 1952, Serial No. 320,477

2 Claims. (Cl. 260—648)

This invention relates to a novel method of performing addition chlorination of benzene in the preparation of benzene hexachloride.

It is well known that benzene hexachloride may be prepared by the addition reaction of benzene and chlorine in the absence of a chlorination substitution catalyst such as ferric or aluminum chloride. This addition chlorination reaction is facilitated by resort to various catalytic means such as actinic light, that is, light usually about 2500 to 4500 A. in wave length or organic peroxides.

Even the presence of minor amounts of a substitution catalyst such as ferric chloride in the reaction mixture has resulted in the preferential formation of chlorine substitution products, e. g., chlorobenzenes, rather than benzene hexachloride. This has been true despite the presence of one or more of the various recognized catalytic means for facilitating addition chlorination of benzene.

The quantity of substitution catalyst which will apparently result in this preferential formation of chlorine substituted benzenes is unusually small. For example, substitution chlorination occurs when the reactants have been in contact with iron or iron containing alloys such as steel. Consequently, one of the conventional precautions that has been practiced prior to this invention involved performing the reaction in non-ferrous equipment, notably glass or nickel. This materially increases the cost of equipment used in this process.

According to this invention, benzene hexachloride may be prepared by addition chlorination of benzene without concern about the metallic material of construction of the equipment. Benzene and chlorine may now be reacted in ferrous equipment with results comparable to those obtained with glass or nickel. Use of ferrous equipment is advantageous, particularly since the cost and maintenance of glass or nickel equipment is higher than that of steel equipment.

It has been found that addition chlorination of benzene may be readily practiced in ferrous or other metallic equipment without encountering undue substitution chlorination by performing the reaction under substantially anhydrous conditions, e. g., by maintaining the water content in the reaction mixture such that it does not exceed 50 parts per million by weight of the mixture.

Preparation of benzene hexachloride, in accordance with this invention, is effected by providing a reaction mixture containing benzene and chlorine while maintaining the concentration of water in the mixture below 50 parts per million by weight of the mixture and irradiating the reaction mixture with actinic light, for instance, ultraviolet light.

It is well to note that unless specific precautions are taken to remove water from the reactants and to provide a system from which water has been removed, the concentration of water in the reaction mixture will be far in excess of 50 parts per million, and it will be impossible to attain substantially anhydrous conditions essential to practice this invention. Thus, the water present due to the humidity of the atmosphere, for example, suffices to provide a water concentration in the mixture substantially above 50 parts per million. Likewise, the quantity of water that is invariably dissolved in the benzene, chlorine, or other material present in the system is enough to provide a water concentration far in excess of that required by this invention.

The exact technique employed to provide these substantially anhydrous conditions varies considerably. In general, it requires that the benzene, chlorine and other materials such as nitrogen and benzene solvent which may be employed in addition chlorination of benzene be of sufficient purity or that they be treated to remove any water present therewith. It likewise may necessitate the use of an airtight, or essentially airtight reaction system to exclude the presence of atmospheric air. Many techniques for effecting these results are known.

Besides effecting the removal of traces of water in the materials which will be present in the reaction zone and avoiding the presence of atmospheric air in the zone, it may also be advantageous to employ a dehydrating agent, such as phosphorous pentoxide in the reaction zone, to absorb any water that still may be present notwithstanding such specific precautions. It is also possible to use a dehydrating agent outside of the reaction zone such as in a cartridge through which a portion of the reaction mixture is cycled. The dehydrating agent, of course, should be inert, or substantially inert under the reaction conditions with respect to benzene, chlorine, benzene hexachloride or other component of the system such as nitrogen or the solvent when the latter two are used. A variety of such agents which are useful will be apparent from a consideration of the above-outlined requirements. Some such agents include phosphoric acid, calcium hydride, and like dessicants.

This invention may be practiced in conjunction with any method of additive chlorination of benzene in the preparation of benzene hexachloride. It is applicable to processes wherein liquid or gaseous chlorine and benzene are reacted. The temperature at which the reaction is performed may vary from about plus 75° C. to minus 100° C., depending on the specific process.

At temperatures above 5° C., the process normally involves passing gaseous or liquid chlorine into a pool of benzene. Below 5° C., one process which may be employed comprises adding benzene to a refluxing pool of liquid chlorine, at for example, minus 33° C. According to another low temperature process, gaseous or liquid chlorine may be fed into a mixture of benzene and solvent, said mixture having a lower freezing point than benzene per se. A wide variety of solvents are useful for this purpose.

Solvents which are essentially inert at reaction condition and will depress the freezing point of the reaction mixture are satisfactory. Even those solvents which only chlorinate slightly or which upon chlorination yield commercially useful materials may be used. Typically, fluorochloromethanes such as dichlorodifluoromethane, trichloromonofluoromethane, and higher fully fluorinated and chlorinated hydrocarbons containing only fluorine, chlorine and carbon atoms; fully halogenated hydrocarbons including carbon tetrachloride, carbon tetrafluoride and the like; liquid sulphuryl chloride, liquid phosgene; thionyl chloride; acetic acid; propionic acid; partially halogenated hydrocarbons containing up to and including 4 carbon atoms such as ethylene dichloride, chloroform, methylene chloride, methyl chloride, methyl chloroform and corresponding bromides, iodides or fluorides may be employed.

As already mentioned, when solvents are employed, it is advisable to remove any water that is frequently present therewith. Frequently, such treatment is conveniently effected by treating the benzene-solvent mixture simultaneously, although it is not necessary.

The invention may be also practiced in conjunction with processes employing other catalytic means in lieu of, or in combination with actinic light. Several such catalytic means include gamma irradiation or other high frequency electromagnetic radiation, peroxides such as benzoyl peroxide, trichloroacetyl peroxide, phenylacetyl peroxide, and the like, and peroxydicarbonate esters such as isopropyl peroxydicarbonate.

The following example illustrates one way in which this invention may be practiced:

*Example*

Reference is made to Figure 1 of the accompanying drawing which diagrammatically illustrates the apparatus that was employed. A liquid mixture of benzene and methylene chloride containing 70 per cent by weight of methylene chloride was fed into the top of column 1 packed with Berl saddles. This feed generally analyzed as containing a minimum of 235 parts per million by weight of water. Heat was applied to the column by a reboiler at the bottom thereof and the column was operated such that the weight ratio of the downflowing liquid to upflowing gas was 2.14. The gases flowing out of the top of the column were passed through and condensed in condenser 2 and returned to the column. Water was collected in trap 3 and removed therefrom periodically.

The purified benzene-methylene chloride mixture removed from the bottom of the tower normally contained less than 40 parts per million by weight of water. This mixture was fed to the continuous system employed for preparing benzene hexachloride.

The reaction system included 150-gallon steel reactor 4, tank 5, pump 6, and heat exchanger 7. The mixture in reactor 4 was agitated by mechanical stirring means 11. Cooling the recycled material in heat exchanger 7 controlled the reaction temperature. One 4500-watt Hanovia lamp disposed in well 12 within the reactor provided the actinic irradiation for promoting the reaction. This system had a total capacity of 250 gallons. In the course of the process, pump 6 was operated to circulate 125 gallons per minute in the system. The entire system was kept airtight.

While the operation of the system will be described in terms of its continuous operation, it is to be understood that the equilibrium conditions of such operation were first achieved by conventional technique, i. e., carrying out the reaction under batchwise conditions until the desired equilibrium conditions were obtained. Such equilibrium was achieved by charging a batch of methylene chloride and benzene purified in tower 1, to reactor 4, where it was cooled to minus 15° C. and swept with nitrogen. Chlorine was then added until the desired chlorine concentration existed in the reaction mixture. Thereafter, the chlorine was fed at about 25 pounds per hour with the light in well 12 on until 65 per cent of the benzene was converted to benzene hexachloride. At this point, operation as a continuous process commenced.

In these runs, the reaction temperature of the mixture was maintained at minus 15° C., the chlorine concentration was 0.6 per cent by weight of unreacted benzene and solvent in the reaction mixture, and approximately 65 per cent by weight of the benzene in the initial benzenemethylene chloride feed mixture was converted to benzene hexachloride.

Liquid chlorine at the average rate of 25 pounds per hour was fed to reactor 4 admixed with nitrogen at 8 below the liquid level of the reaction mixture. Nitrogen was also added to the system between pump 6 and heat exchanger 7. The total amount of nitrogen so added was equal to 20 per cent by volume of the chlorine added to the system. Precautions were taken to insure that the moisture content in the liquid chlorine and nitrogen employed averaged below 50 parts per million. Phosphorous pentoxide at the rate of 100 grams for every 8 hours of operation was added to reactor 4.

The product was withdrawn from tank 5 via pipe 9 at a substantially uniform rate such that approximately 5 tons of benzene hexachloride was produced per month. After purification by atmospheric and vacuum distillation to remove the solvent and unreacted benzene, a product analyzing (infrared analysis) 21 per cent gamma isomer by weight of the benzene hexachloride was obtained.

The gases in the system, such as nitrogen, possibly chlorine, and others were vented at 10 via an appropriate means which precluded leakage of air into the system.

The contents of reactor 4 were sampled periodically for over a month of continual operation and consistently showed the water concentration to be no higher than 50 parts per million by weight of the reaction mixture.

This system was run at benzene conversion percentages ranging up to 72 per cent by weight of the benzene. It was also operated at temperatures up to between 25 and 30° C. In all cases, when the concentration of water was below 50 parts per million, no substitution chlorination was observed that interfered with addition chlorination.

Attempts were made to run this system at moisture levels substantially above 50 parts per million, such as 100 parts per million by weight of water. In each instance, substantial evolution of hydrogen chloride was observed indicative of substitution chlorination, and no benzene hexachloride was found. The benzene was chlorinated to ortho and para dichlorobenzenes.

While practice of this invention has been described with reference to a continuous system, it is equally applicable to use in batch reactions. It is, of course, most suitable in continuous systems since they are more readily adapted to airtight or closed systems.

It is further noted that the reaction need not be practiced at any specific chlorine concentration in the reaction mixture, for the benefits of the invention to obtain. Chlorine concentration control is related to optimum gamma isomer production, and is, therefore, desirable from that consideration.

Control of the water concentration in the reaction mixture in accordance with this invention is not limited in utility to use with ferrous equipment, although as far as known, greatest advantages are obtained by being able to employ ferrous equipment in lieu of glass or nickel equipment. For example, control of water concentration makes it possible to employ copper equipment, which otherwise would tend to favor substitution chlorination of benzene. Further, practice of this invention also tends to reduce the traces of chlorobenzenes that are almost inevitably found in products even when glass or nickel reactors are used. It has also been further observed that practice of this invention avoids coating on the cooling surfaces and thereby enhances heat removal.

Although the present invention has been described with reference to the specific details of certain embodiments thereof, it is not intended that such details shall be regarded as limitations upon the scope of the invention except insofar as included in the accompanying claims.

What is claimed:

1. A method of preparing benzene hexachloride which comprises additively chlorinating benzene in a liquid mixture containing benzene and chlorine under the influence of an addition chlorination catalyst, maintaining substantially anhydrous conditions in the reaction mixture and performing the chlorination in a reactor having a substantial metallic ferrous surface area in contact with the liquid mixture.

2. A method of preparing benzene hexachloride which comprises additively chlorinating benzene in a liquid mixture containing benzene and chlorine under the influence of a addition chlorination catalyst, maintaining the concentration of water below 50 parts per million by weight in the liquid reaction mixture and performing the chlorination in a reactor having a substantial metallic ferrous surface area in contact with the liquid mixture.

References Cited in the file of this patent

UNITED STATES PATENTS

| 2,218,148 | Hardie | Oct. 15, 1940 |
| 2,388,156 | Kelley | Oct. 30, 1945 |
| 2,691,050 | Goenee et al. | Oct. 5, 1954 |

OTHER REFERENCES

Smith et al.: Jour. Amer. Chem. Soc., vol. 55, pages 4444–4459 (Nov. 1933; 16 pages).

Groggins: Unit Processes in Organic Synthesis, 3rd edition, page 237 (1 page only), published by McGraw-Hill Book Company, New York (1947).